US012624983B2

(12) United States Patent
Zwijze et al.

(10) Patent No.: US 12,624,983 B2
(45) Date of Patent: May 12, 2026

(54) VEHICULAR LOAD SENSING SYSTEM AND METHOD USING TILT SENSORS

(71) Applicant: SmartWitness USA, LLC, Schaumburg, IL (US)

(72) Inventors: Robert Zwijze, Vriezenveen (NL); Gerard Klaasse, Apeldoorn (NL); Corbin J. Los, Enschede (NL); Sietse Hendriks, Enschede (NL); Dennis Kamphuis, Hengelo (NL)

(73) Assignee: SmartWitness USA, LLC, Schaumburg, IL (US)

( * ) Notice: Subject to any disclaimer, the term of this patent is extended or adjusted under 35 U.S.C. 154(b) by 455 days.

(21) Appl. No.: 18/161,481

(22) PCT Filed: Jul. 29, 2021

(86) PCT No.: PCT/US2021/043749
§ 371 (c)(1),
(2) Date: Jan. 30, 2023

(87) PCT Pub. No.: WO2022/026743
PCT Pub. Date: Feb. 3, 2022

(65) Prior Publication Data
US 2024/0271988 A1 Aug. 15, 2024

Related U.S. Application Data

(60) Provisional application No. 63/058,859, filed on Jul. 30, 2020.

(51) Int. Cl.
*G01G 19/12* (2006.01)

(52) U.S. Cl.
CPC ................................... *G01G 19/12* (2013.01)

(58) Field of Classification Search
CPC ........... G01G 19/12; B60G 2400/0516; B60G 2204/11
See application file for complete search history.

(56) References Cited

U.S. PATENT DOCUMENTS 4,756,374 A * 7/1988 Bailey ..................... G01G 7/06
177/128
5,390,949 A 2/1995 Naganathan et al.
(Continued)

FOREIGN PATENT DOCUMENTS

DE 102015202696 A1 * 8/2016
KR 102129946 B1 7/2020
(Continued)

OTHER PUBLICATIONS

Machine translation of KR 102129946 (Year: 2020).*
(Continued)

*Primary Examiner* — Natalie Huls
(74) *Attorney, Agent, or Firm* — Vedder Price P.C.

(57) ABSTRACT

A system and method calculates a vehicle load on a suspension system of a vehicle using a plurality of tilt angle sensors. The angle sensors are attached to the suspension system and configured to measure an angle with respect to gravity. A first angle sensor is configured to measure a first angle. A second sensor configured to measure a second angle. The measured first and second angles are combined to obtain a combined value representative of a vehicle load adjusted for tilt.

4 Claims, 9 Drawing Sheets

(56)                  References Cited

U.S. PATENT DOCUMENTS

| | | | |
|---|---|---|---|
| 5,681,998 A | 10/1997 | Nakazaki et al. | |
| 11,519,776 B2 * | 12/2022 | Davis ................... | G01G 19/086 |
| 2019/0337523 A1 * | 11/2019 | Rogness ............... | G01G 19/08 |
| 2022/0057252 A1 | 2/2022 | Krueger et al. | |
| 2022/0307891 A1 * | 9/2022 | Zwijze ................... | B60G 9/003 |

FOREIGN PATENT DOCUMENTS

| | | |
|---|---|---|
| WO | WO200908482 A1 | 1/2009 |
| WO | WO2009084824 A1 | 7/2009 |
| WO | WO2019007528 A1 | 1/2019 |
| WO | WO2020126363 A1 | 6/2020 |

OTHER PUBLICATIONS

The International Search Report and Written Opinion for PCT Application No. PCT/US21/43749, mailed Dec. 14, 2021, 11 pages.
Extended European Search Report mailed Nov. 30, 2023 for European Application No. 21850225.0, a foreign counterpart to U.S. Appl. No. 18/161,481, 8 pages.

* cited by examiner

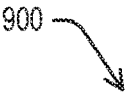

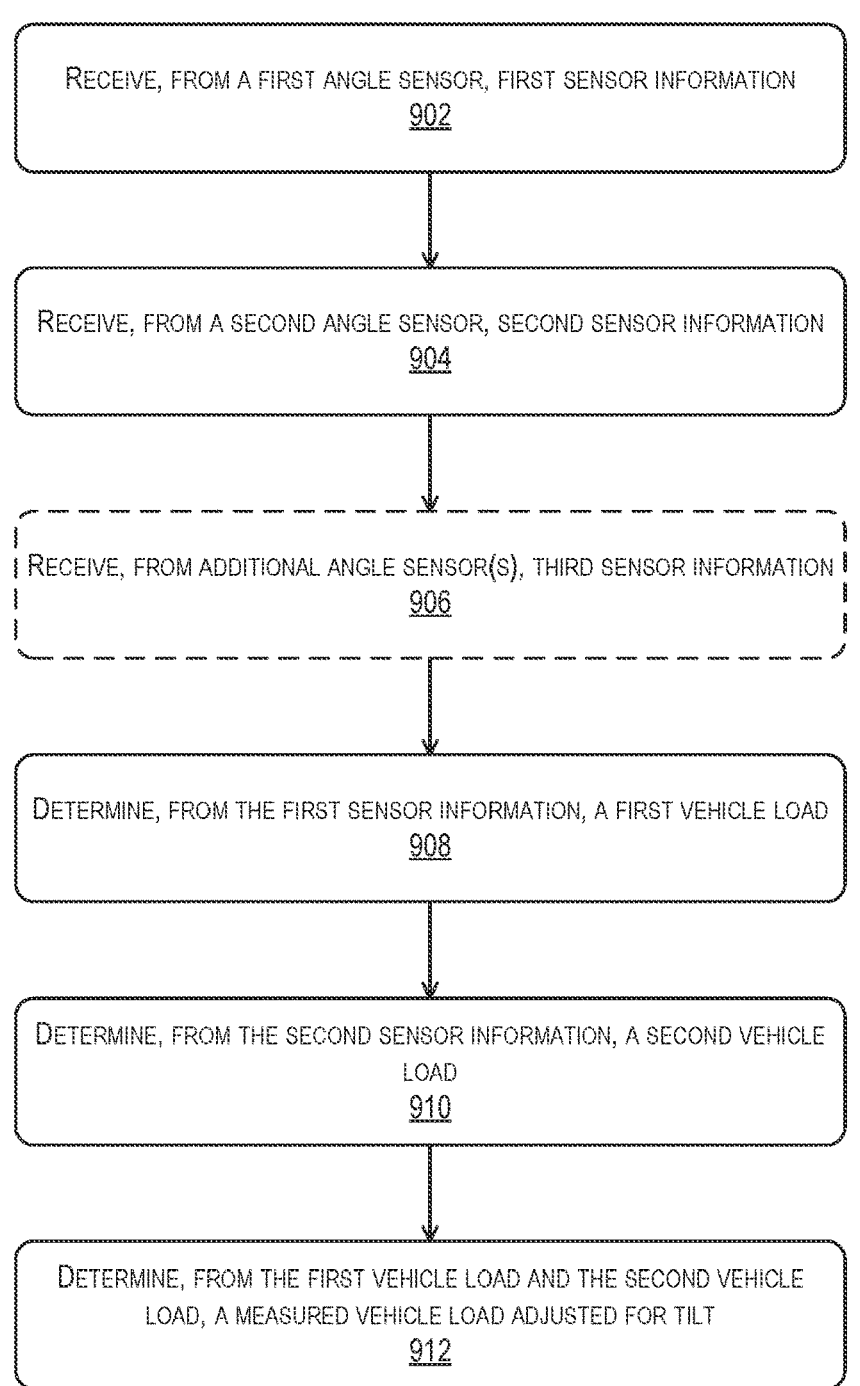

900

RECEIVE, FROM A FIRST ANGLE SENSOR, FIRST SENSOR INFORMATION
902

RECEIVE, FROM A SECOND ANGLE SENSOR, SECOND SENSOR INFORMATION
904

RECEIVE, FROM ADDITIONAL ANGLE SENSOR(S), THIRD SENSOR INFORMATION
906

DETERMINE, FROM THE FIRST SENSOR INFORMATION, A FIRST VEHICLE LOAD
908

DETERMINE, FROM THE SECOND SENSOR INFORMATION, A SECOND VEHICLE
LOAD
910

DETERMINE, FROM THE FIRST VEHICLE LOAD AND THE SECOND VEHICLE
LOAD, A MEASURED VEHICLE LOAD ADJUSTED FOR TILT
912

VEHICULAR LOAD SENSING SYSTEM AND METHOD USING TILT SENSORS

CROSS-REFERENCE TO RELATED APPLICATIONS

This Application is a national stage entry under 35 USC § 371 of International Application No. PCT/US2021/043749, filed Jul. 29, 2021, which claims priority to U.S. Provisional Application No. 63/058,859, filed Jul. 30, 2020, the entire contents of both of which are incorporated by reference herein.

FIELD OF THE TECHNOLOGY

The subject disclosure relates to sensing vehicular loads, and more particularly to load sensing on tractor-trailer suspension systems using tilt angle sensors.

BACKGROUND OF TECHNOLOGY

Large-scale tractor-trailer vehicles are designed to support heavy loads. In tractor-trailer vehicles for example, freight is contained in a cargo area. The weight of the freight is distributed to a chassis of the vehicle. The weight and its distribution may affect operation of the vehicle so that monitoring the status of the suspension system and other components can provide valuable information, increase safety, and improve overall performance and reliability.

In some cases, sensors can be included to measure the vehicle load. However, installing sensors on an existing vehicle can be difficult. Some conventional applications have considered using strain sensors to measure a vehicle load. However, integrating strain sensors can be complex from both a calibration and mechanical coupling standpoint. Also, the installation of sensors can affect the mechanical structure of the vehicle, and therefore may be undesirable. Therefore, there is a need for improved systems and techniques to measure a vehicle load without installing sensors and/or adversely affecting the vehicle.

SUMMARY OF THE TECHNOLOGY

In light of the needs described above, in at least one aspect, the subject technology relates to a vehicular load sensing system that determines a vehicle load by combining measured data from angle sensors. The angle sensors are easy to install and can be attached to an existing suspension system using a simple clamp, for example, or can be installed via other installation methods that are not intrusive and/or restrictive on an existing structure of a vehicle as opposed to traditional load sensing equipment. The load sensing system combines data and/or information from multiple sensors to adjust for vehicle tilt and/or obtain an accurate measurement of vehicle load based on the combined data. This can be particularly advantageous for tractor-trailers where knowing the total vehicle load is important, and vehicle load can change significantly depending on the vehicle freight at a given time.

BRIEF DESCRIPTION OF THE DRAWINGS

So that those having ordinary skill in the art to which the disclosed systems and techniques pertain will more readily understand how to make and use the same, reference may be had to the following drawings.

2

Figure 1:
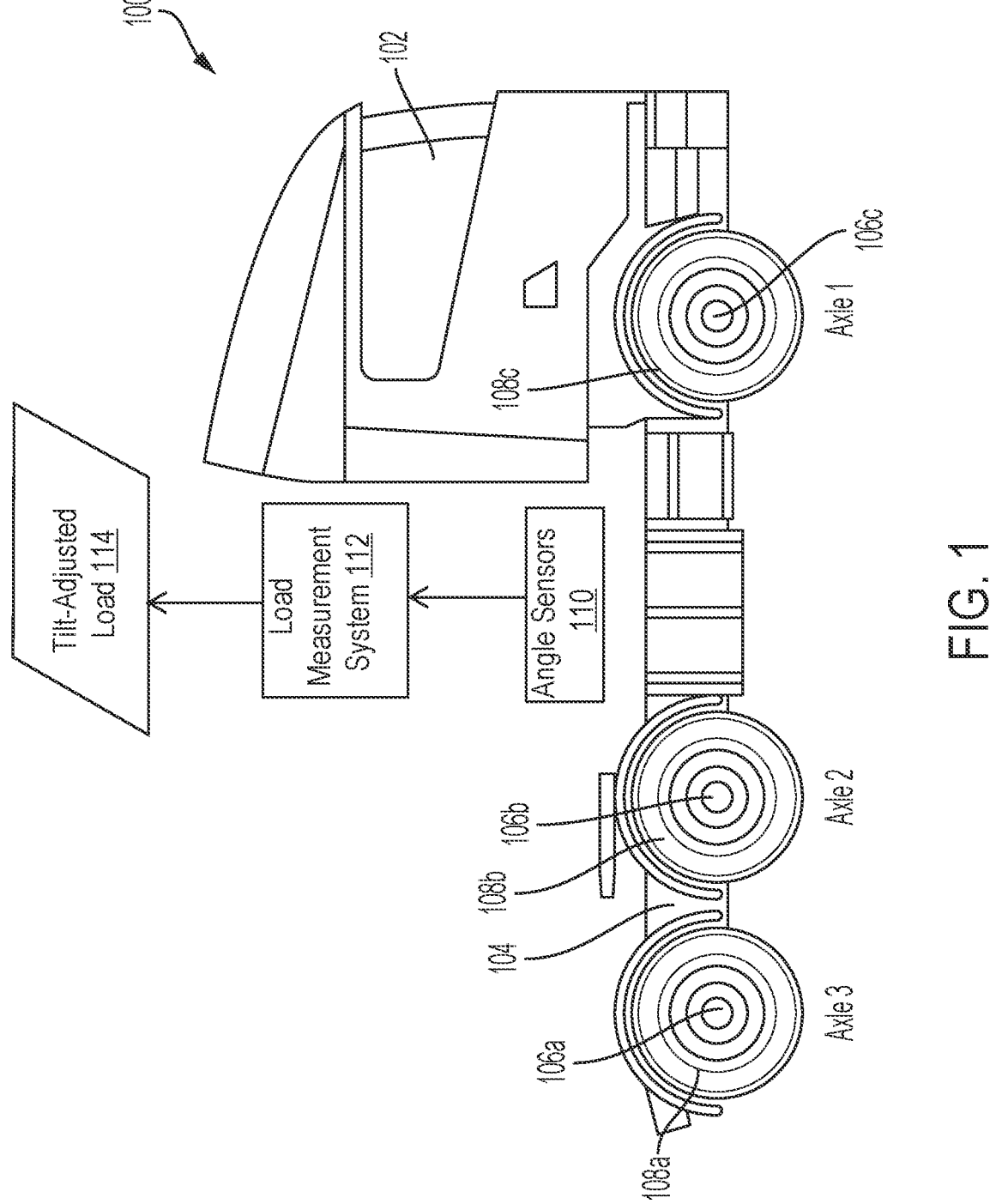

FIG. 1 is a side view of an exemplary tractor configured in accordance with the subject technology.

Figure 2:
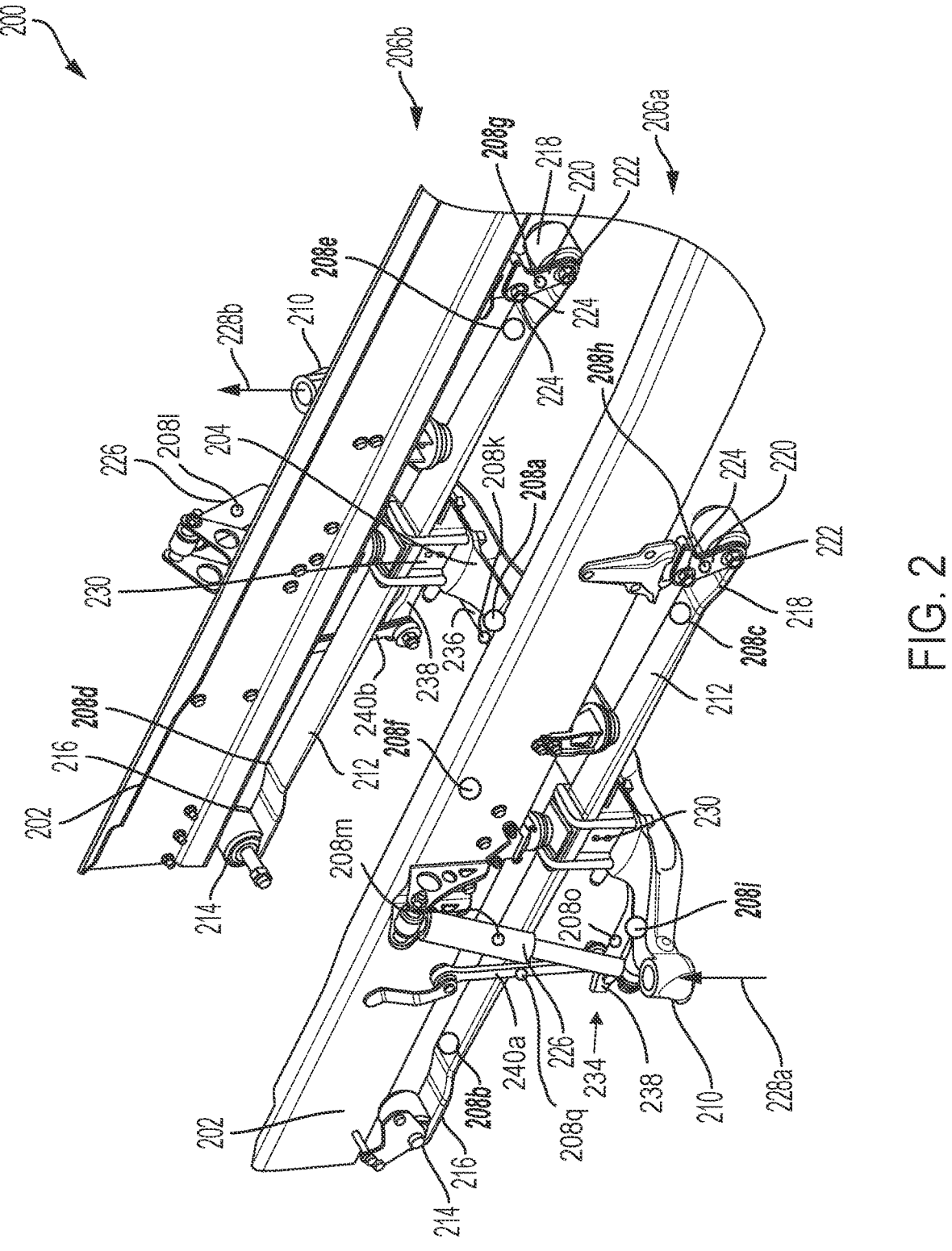

FIG. 2 is a partial perspective view of an exemplary vehicle suspension system with angle sensors, in accordance with examples of the subject technology.

Figure 3:
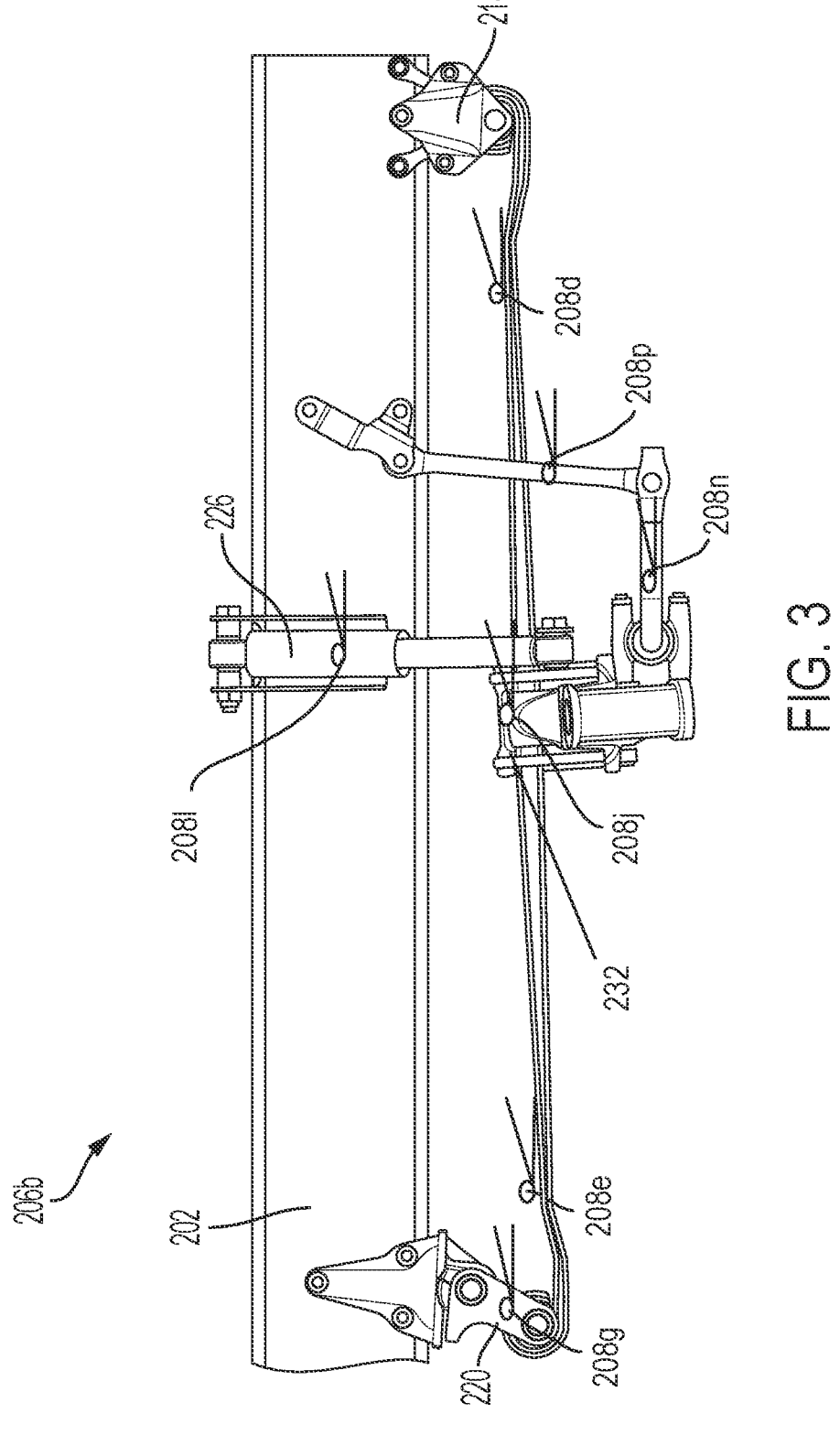

FIG. 3 is side view of the vehicle suspension system of FIG. 2.

Figure 4:
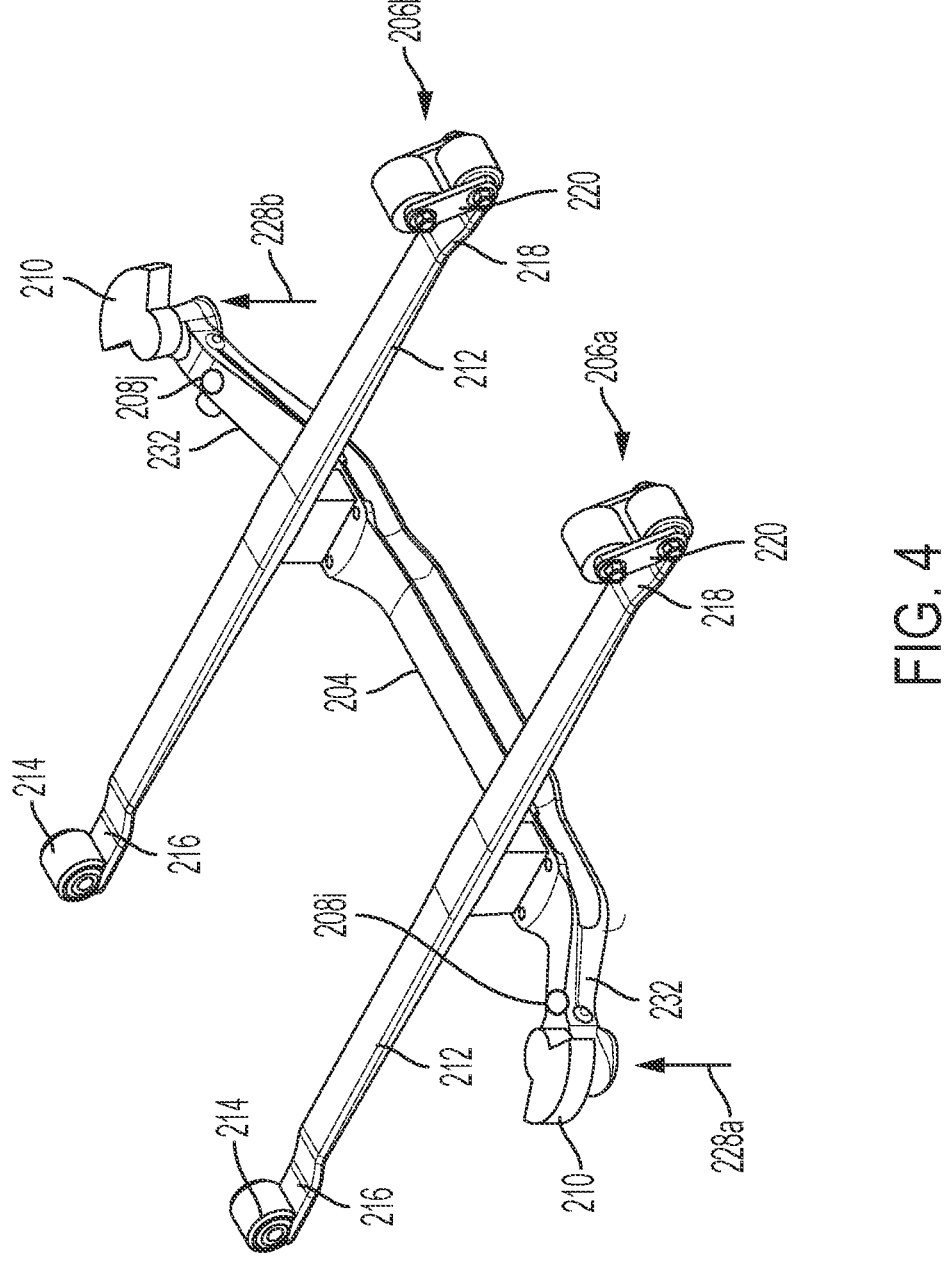

FIG. 4 is a perspective view of select components of the vehicle suspension system of FIG. 2.

Figure 5:
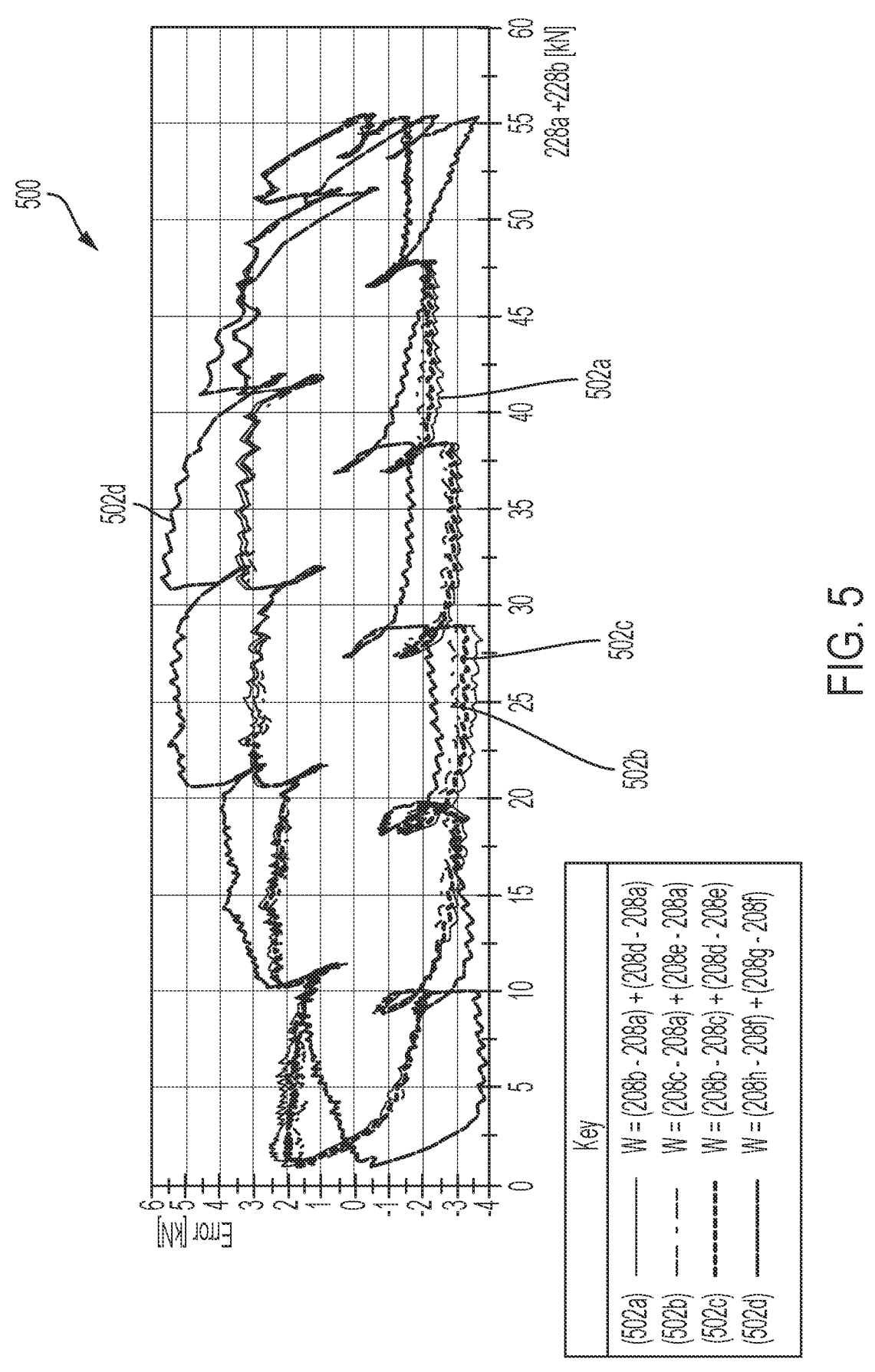

FIG. 5 is a graph plotting the error of various sensor combinations over various loads under test conditions.

Figure 6:
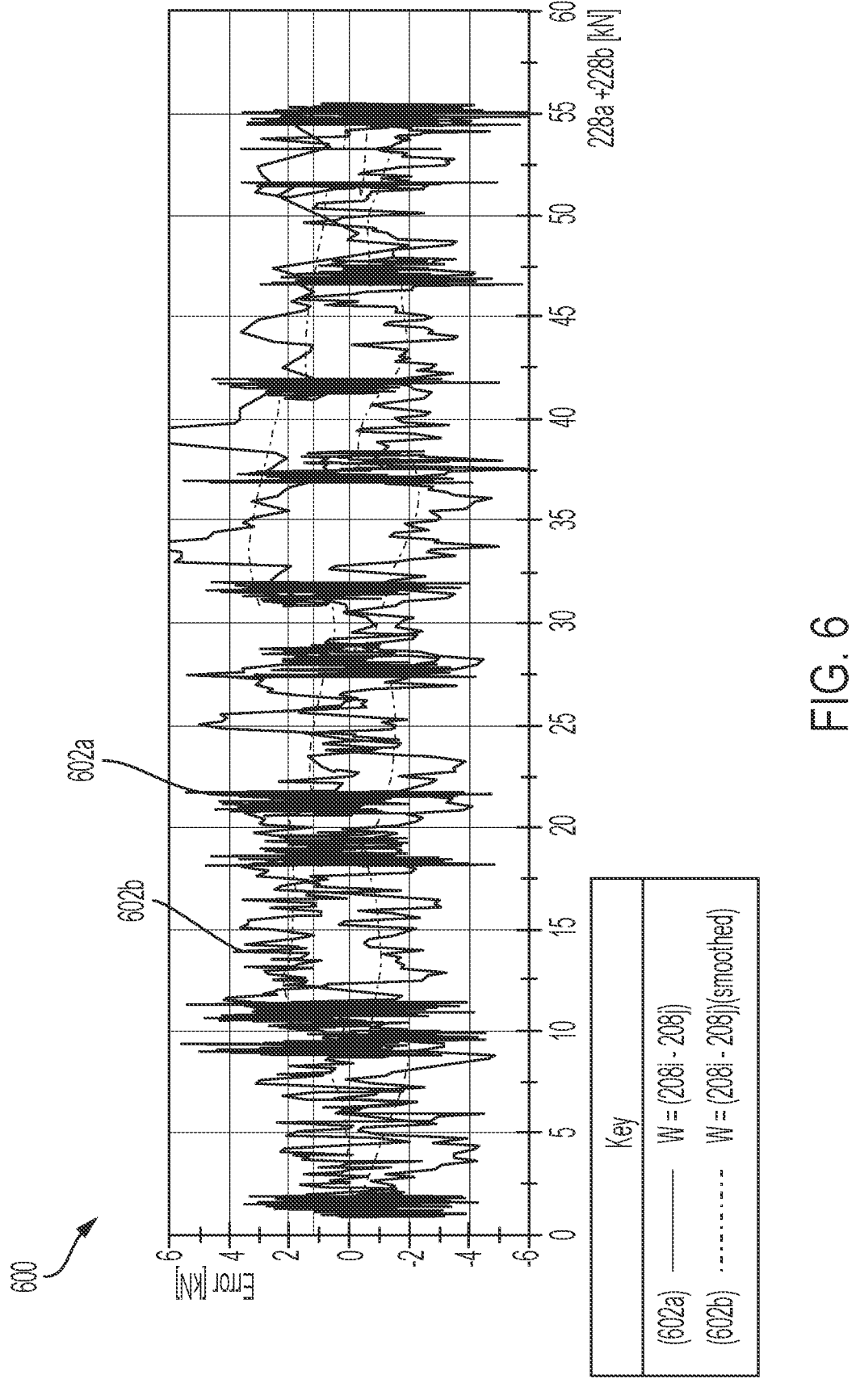

FIG. 6 is another graph plotting error of a sensor combination over various loads under test conditions.

Figure 7:
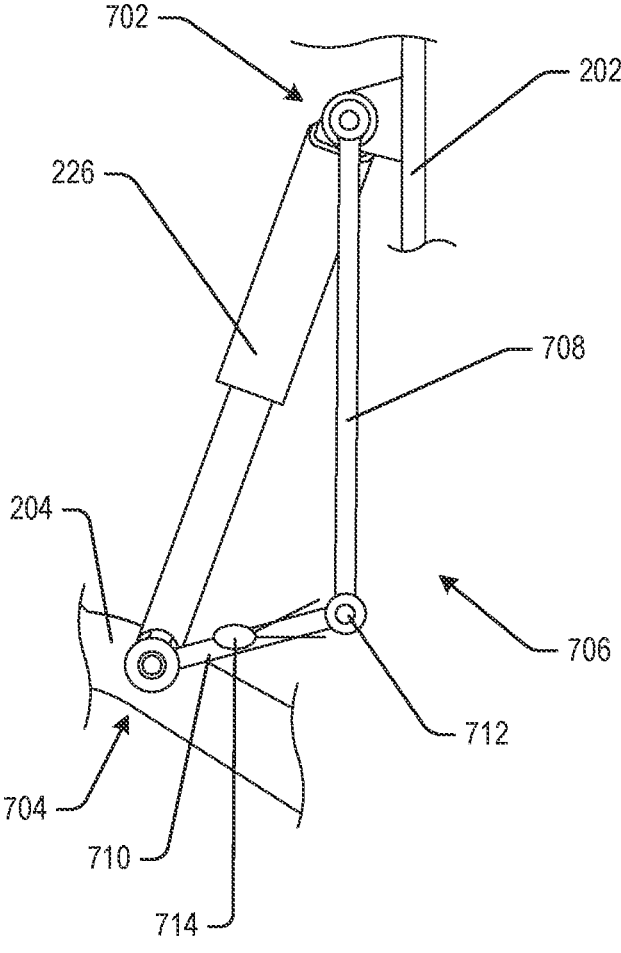

FIG. 7 is a partial front view of an alternative implementation of the vehicle suspension system of FIG. 2.

Figure 8:
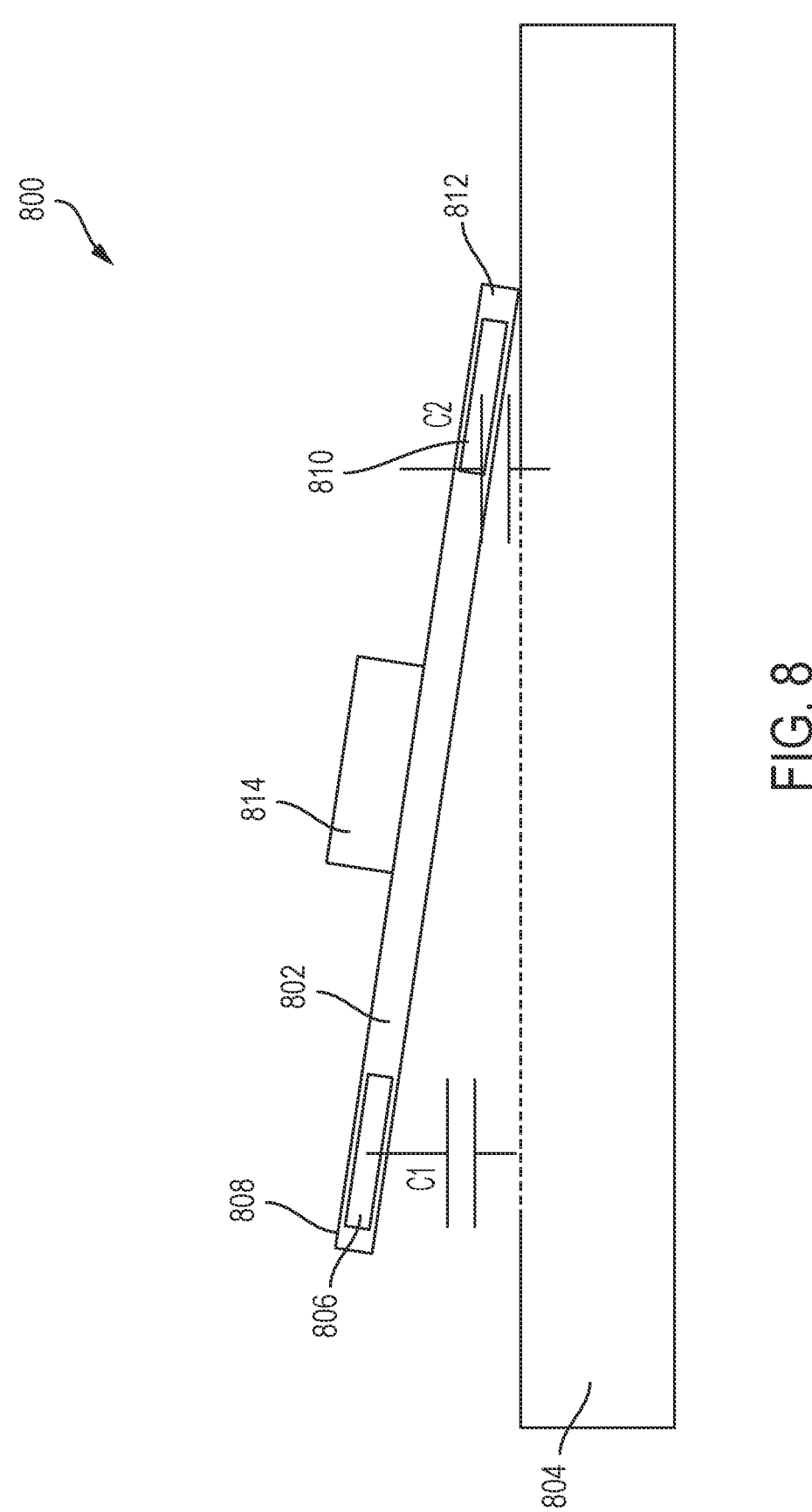

FIG. 8 is a front view of an exemplary angle sensor configured in accordance with the subject technology.

FIG. 9 is a flowchart illustrating an example process for determining a measured vehicle load adjusted for tilt, according to implementations of this disclosure.

DETAILED DESCRIPTION

The subject technology overcomes many of the prior art problems associated with load sensing on vehicle including tractor-trailer trucks. In brief summary, the subject technology provides a load sensing system which combines data and/or information from multiple, easy to install, angle sensors, to determine vehicle load. The advantages, and other features of the systems and methods disclosed herein, will become more readily apparent to those having ordinary skill in the art from the following detailed description of certain preferred embodiments taken in conjunction with the drawings which set forth representative examples of the present disclosure. Like reference numerals are used herein to denote like parts. Further, words denoting orientation such as "upper," "lower," "distal," and "proximate" are used to help describe the location of components with respect to one another. For example, an "upper" surface of a part is merely meant to describe a surface that is separate from the "lower" surface of that same part. No words denoting orientation are used to describe an absolute orientation (e.g., where an "upper" part must always be at a higher elevation).

Referring now to FIG. 1, a non-limiting example of a tractor 100 for a tractor trailer is shown. The tractor 100 includes a cabin 102 connected to a vehicle suspension system 104. In the exemplary embodiment, the suspension system 104 includes three axles 106a, 106b, 106c each supporting a plurality of tires, of which a first tire 108a, a second tire 108b, and a third tire 108c are visible. The front axle 106c acts as a steering axle, guiding the direction of the vehicle, among other functions.

The tractor 100 also includes a number of angle sensors 110. As will be discussed in more detail below; the angle sensors 110 are disposed at various positions on the tractor 100, specifically on or near the axles of the tractor 100 and/or on aspects of the suspension system 104 of the tractor 100, such as a chassis. These sensors may record, generate, and/or otherwise obtain data associated with angular displacements of components of the tractor 100 and/or loads associated with those angular displacements. For example, and without limitation, an angular displacement of one of the angle sensors 110 may be correlated (indirectly or directly) to a force at the one of the angle sensors 110.

The tractor 100 also includes a load measurement system 112 configured to determine a tilt-adjusted load 114 of the tractor 100, e.g., at one or more of the axles 106. In implementations of this disclosure, the load measurement system 112 can be implemented as a computing system including one or more processors and memory storing instructions implemented by the processor(s), e.g., to determine the tilt-adjusted load 114 from sensor data generated by the angle sensors 110. In one example implementation, the load measurement system 112 can receive angle measurements (e.g., angular displacements) from the angle sensors 110 and generate loads correlating to those measurements. In one non-limiting example, the load measurement system 112 can determine a first load measurement, e.g., associated with a first lateral side of the tractor 100, from a first subset of the angle sensors 110 and a second load measurement, e.g., associated with a second lateral side of the tractor 100, from a second subset of the angle sensors 110. The load measurement system 112 can then determine the tilt-adjusted load 114 from the first and second load measurements. Examples of this and other functionality associated with the load measurement system 112 are detailed further below, for example, in connection with FIGS. 5 and 6 below. Although not illustrated in FIG. 1, the tilt-adjusted load 114 (and/or data associated with the angle sensors 110) can be presented to a driver in the cabin 102, e.g., via a display or alert indicator within the cabin 102.

FIGS. 2-4 show parts of an exemplary vehicle suspension system 200 in accordance with the subject technology. In particular, FIG. 2 is a rear-overheard perspective view of a portion of a vehicle suspension system 200 including a chassis 202 and front steering axle 204. The vehicle suspension system 200 can be included as part of a tractor, such as the tractor 100. FIG. 3 is a right-side view of the suspension system 200 of FIG. 2, and FIG. 4 is a rear-overhead perspective view of a portion of the vehicle suspension system 200 of FIG. 2 with some components omitted to more clearly illustrate other components. The vehicle suspension system 200 can be included as part of a tractor, such as the tractor 100, or otherwise part of a tractor-trailer suspension system. Without limitation, the vehicle suspension system can be the suspension system 104.

In the illustrated example of FIGS. 2-4, the suspension system 200 is generally symmetrical about a longitudinal axis, except as otherwise shown and described herein. That is, a first side 206a and a second side 206b of the suspension system 200 have components that are generally identical, and for ease of illustration, these identical parts are labeled using identical reference numerals.

The suspension system 200 includes a chassis 202 generally comprising two parallel beams in FIG. 2 and a steering axle 204 (which may correspond to the axle 106c discussed above) extending perpendicular to the chassis 202. The steering axle 204 terminates at opposite ends 210, and the ends 210 are configured for coupling to wheels (not shown). Two leaf springs 212 run across (for example, perpendicularly to) the steering axle 204 of the vehicle and parallel to the frame of the chassis 202. Opposite ends of each of the leaf springs 212 are coupled to the chassis 202. More specifically, a first end 216 of each of the leaf springs 212 is rotatably connected to the chassis 202 via a pivot connector 214 (or simply a "pivot 214"). The pivot 214 allows for turning the axle 204 from side to side to steer the vehicle. A second, opposite end 218 of each of the leaf springs 212 is connected to the chassis 202 via a shackle 220. A lower bolt 222 connects a lower end of the shackle 220 to the leaf spring 212 while an upper bolt 224 connects an upper portion of the shackle 220 to the chassis 202. A mechanical coupling 230 connects each leaf spring 212 to the axle 204, at a position between the first end 216 and the second end 218. Additionally, a connection member 226—in this example, a piston functioning as a shock absorber—connects the chassis 202 and the steering axle 204. Load on the vehicle includes a first force generally at one of the ends of the steering axle 204, represented by a first force arrow 228a, and a second force generally at the other of the ends of the steering axle 204, represented by a second force arrow 228b. In response to the forces represented by the force arrows 228a. 228b, the connection member(s) 226 compress, thereby reducing the effect of bumps or other disturbances, including those having a lateral component. As will also be appreciated, as the connection member(s) 226 compress and expand, an angle of the connection member(s) 226 changes, e.g., relative to the chassis, relative to a horizontal line, and/or relative to some other reference.

The suspension system 200 also includes a sway bar 234. As best illustrated in FIG. 1, the sway bar 234 includes an elongate central portion 236 extending between spaced-apart end portions 238 angled relative to the central portion 236. The central portion 236 is disposed generally parallel to the steering axle 204 and the end portions 238 extend generally perpendicular from the central portion 236. The suspension system 200 also includes a first swivel bar 240a and a second swivel bar 240b (collectively, "the swivel bars 240"). Individual of the swivel bars 240 are coupled to, and extend between, the end portions 238 of the sway bar 234 and the chassis 202. In examples, the sway bar 234 may be secured along the central portion 236 in a manner that allows the sway bar 234, e.g., the end portions 238, to rotate about a longitudinal axis of the central portion 236. As will be appreciated, such rotation of the sway bar will also cause the swivel bars 240 to pivot relative to the chassis 202 and/or relative to the sway bar 234.

The suspension system 200 includes tilt angle sensors 208 (or angle sensors, which may be the angle sensors 110), configured in accordance with the subject technology. The angle sensors 208 are shown in block form, e.g., schematically, for ease of illustrating the surrounding parts of the suspension system 200. Each of the angle sensors 208 is generally configured to detect (and quantify) an angular displacement of one or more components of the suspension system, e.g., relative to a reference, which may be a neutral or unloaded position, a reference plane or axis, or other component in some examples. The angle sensors 208 are shown and described in certain configurations throughout this disclosure, however it should be understood that this is by way of example only. Different numbers of sensors and/or different sensor positions could be included in different embodiments. In different embodiments, each sensor 208 can be a standard angle sensor, as are known, configured in accordance with the teaching herein. Alternatively, in some embodiments, the sensors 208 are mechanically and/or electrically configured to include certain features, as discussed in more detail below (see, e.g., the sensor 800 of FIG. 8). The sensors 208 can be easily attached to the existing suspension system 200 of the vehicle using simple mechanical fixation devices, such as via clamps, glue, bolts, or any other practical fixation devices offering the benefits as expected herein.

While FIGS. 2-4 primarily illustrate the mechanical components of the suspension system 200, it should be understood that the angle sensors 208 are part of (and/or are in communication with) a vehicle load measurement system, e.g., the load measurement system 112, configured in accordance with the subject technology. The sensors 208 can also include, or be connected to, the necessary electrical components to generate, process, store, and/or transmit data. Alternatively, the vehicle load measurement system can include a processor, memory for storing data, and a transceiver for sending and receiving data between the sensors 208. Output from the sensors 208 and/or vehicle load measurement system can then be provided to a driver within the vehicle cabin, or to an external device, as desired.

As shown in FIG. 2, in a non-limiting configuration, a first angle sensor 208a is attached proximate a middle of the axle 204. A second angle sensor 208b is located proximate the first end 216 of the one of the leaf springs 212 on the first side 206a of the suspension system 200, and a third angle sensor 208c is located proximate the second end 218 of that leaf spring. Similarly, a fourth angle sensor 208d and a fifth angle sensor 208e are located, respectively, proximate the first end 216 and the second end 218 of the one of the leaf springs 212 on the second side 206b. A sixth angle sensor 208f is attached to the chassis 202. (Although not illustrated, another angle sensor may be disposed similarly to the sixth angle sensor on the chassis 202 on the second side 206b.) A seventh angle sensor 208g is associated with the shackle 220 on the second side 206b, and an eighth angle sensor 208h is associated with the shackle 220 on the first side 206a. A ninth sensor 208i is disposed proximate a lateral end of the axle 204 on the first side 206a of the suspension system 200. A tenth sensor 208j (illustrated in FIG. 3 and FIG. 4) generally corresponds to the ninth sensor 208i, but at an opposite end of the axle 204.

FIG. 2 also shows an eleventh sensor 208k disposed on the sway bar 234. In examples, the eleventh sensor 208k is disposed on the central portion 236 of the sway bar 234. In some instances, the eleventh sensor 208k is disposed proximate a middle of the central portion 236. A twelfth sensor 208l and thirteenth sensor 208m are associated with the connection member(s) 226. As noted above, as the connection member(s) 226 expand and contract, their angular orientation changes, e.g., by pivot at a connection to the chassis 202. The twelfth and thirteenth sensors 208l, 208m pivot measure this angular displacement.

The suspension system 200 also includes a fourteenth sensor 208n, a fifteenth sensor 208o, a sixteenth sensor 208p, and a seventeenth sensor 208q. The fourteenth sensor 208n (best shown in FIG. 3) and the fifteenth sensor 208o (labelled in FIG. 2) are disposed to determine angular displacements of the end portions 238 of the sway bar 234. The sixteenth sensor 208p (best shown in FIG. 3) and the seventeenth sensor 208q (labelled in FIG. 2) are disposed to determine angular displacements of the swivel bars 240. As will be appreciated, as the sway bar 234 rotates under load, the end portions 239 of the sway bar 234 rotate about an axis of the central portion 236 of the sway bar 234. The fourteenth, fifteenth, sixteenth, and seventeenth sensors 208n-208q are disposed to sense these angular displacements.

FIG. 3 is a right-side view of the suspension system 200, e.g., showing aspects of the second side 206b of the suspension system 200 in more detail. As shown in FIG. 3, the second side 206b includes the fourth angle sensor 208d associated with the first end of the leaf spring, the fifth angle sensor 208e associated with the second end of the leaf spring, the seventh angle sensor 208g associated with the shackle 220, and the third sensor 208c, the eighth sensor 208h, and a tenth sensor 208j positioned on an axle arm 232 of axle 204. The tenth sensor 208j may generally correspond to the ninth sensor shown in FIG. 2. More specifically, the fourth angle sensor 208d is located near the pivot 214 to sense an angular displacement of the leaf spring 212 proximate the pivot 214. Similarly, the fifth angle sensor 208e is located near the shackle 220) to sense an angular displacement of the leaf spring 212 proximate the shackle 220). Similarly, the seventh sensor 208g may be located on shackle 220, e.g., to determine an angular displacement associated with the shackle 220. The tenth sensor 208j may be attached to the axle arm 232 of the axle 204 to measure an angular displacement associated with the axle arm 232. As shown in the configuration of this view, the angle sensors 208 are placed at spaced locations to determine angular displacements at a number of position on the suspension system 200. In this example the suspension system is associated with a tractor, such as tractor 100, to calculate an accurate load on the tractor 100, although the techniques described herein may be used in other vehicles, including other vehicles configured to tow and/or otherwise haul payloads. As described more below; calculations may be performed after the sensors obtain measurements which can mitigate errors when determining load.

FIG. 4 is a rear-overhead perspective view of the vehicle suspension system 200 of FIG. 2 with several components omitted for clarity. For example, FIG. 4 more clearly illustrates the connection of the steering axle 204 to the leaf springs 212. FIG. 4 also better illustrates an example location of the ninth and tenth angle sensors 208i, 208j.

While the disclosure herein primarily illustrates the mechanical components of the suspension system 200 and the positions of the angle sensors 208, it should be understood that the angle sensors 208 are part of a vehicle load measure system configured in accordance with the subject technology. As such, the sensors 208 can also include, or be connected to, the necessary electrical components to process, store, and transmit data processed by the sensors 208. Alternatively, the vehicle load measurement system can include a processor, memory for storing data, and/or a transceiver for sending and receiving data between the sensors 208. Output from the sensors 208 and/or vehicle load measurement system can then be provided to a driver within the vehicle cabin, or to an external device, as desired.

In general, when a load is present on the vehicle suspension system 200, the components of the suspension system 200 will be placed under strain, causing some deflection, e.g., relative to an unloaded position. The angle sensors 208 are configured to measure an angle with respect to gravity of the earth, and therefore can measure the change in angle as the component onto which each sensor 208 is attached deflects. Aspects of this disclosure use these values to determine the load present on the vehicle. One difficulty with accurately determining vehicle load based on the measurements from the angle sensors 208 is that vehicle tilt can affect the angle of the sensors and create a source of error. Thus, the system shown herein combines measurements from different angle sensors 208 in a way that allows for the tilt of the vehicle to be eliminated, giving a more accurate measurement of vehicle load.

For instance, and as detailed further herein, the load measurement system 112 can combine measurements taken from one or more sensors to determine an overall, tilt-adjusted load for the vehicle. As will be appreciated, because the vehicle is a rigid body, with all parts interconnected via various mechanical couplings, a significant load on the vehicle, regardless of the location of the load, will result in displacement of most, or all, components on the vehicle, as measured by the tilt sensors 206. In some examples, the lead measurement system 112 can combine multiple sensor measurements resulting from load to determine an overall load, adjusted for tilt. In at least some examples, the load measurement system 112 can combine measurements from sensors on a first lateral side of the vehicle suspension system 200, e.g., the first side 206*a*, with measurements taken from one or more sensors on a second lateral side of the vehicle suspension system 200, e.g., the second side 206*b* to determine a tilt-adjusted vehicle load. For example, a first subset of the angle sensors 208 may correspond to a load on the first side 206*a* (e.g., a load at a first end of the axle 204 or at a first wheel) of the trailer 100, and a second subset of the angle sensors 208 may correspond to a load on the second side 206*b* (e.g., a load at a second end of the axle 204 or at a second wheel) of the vehicle. The first load may be determined based at least in part on an angle measured by the first subset of the angle sensors 208 and the second load may be determined based at least in part on an angle measured by the second subset of the angle sensors 208. In examples, the vehicle load measurement system combines the lateral loads, e.g., the first load and the second load, to determine a measured vehicle load adjusted for tilt. Conceptually, when the vehicle (and the load) is level, the load on the lateral sides of the vehicle, e.g., represented by the arrows 228*a*, 228*b* will be substantially equal. However, when the vehicle is tilted, the loads on the lateral sides of the vehicle will be different, and aspects of this disclosure combine these different loads to arrive at the actual, e.g., tilt-adjusted, load at the axle 204. Examples of the concept just described are provided below with reference to FIGS. 5 and 6.

Referring now to FIG. 5, a graph 500 of various combinations of sensor measurements for determining a load on a truck, such as the trailer 100, while removing tilt under test conditions is shown. More specifically, the graph 500 shows a first graph line 502*a*, a second graph line 502*b*, a third graph line 502*c*, and a fourth graph line 502*d* (collectively, the "graph lines 502"). Each of the graph lines 502 represents measurements generated during a test and based on a different combination of sensor measurements for removing tilt. During the test, the truck was unloaded from 56 kN to 0 kN, and then loaded back to 56 kN to complete a hysteresis curve, e.g., represented by each of the graph lines 502. The x-axis of the graph shows the load in kilonewtons (kN) during the test. The y-axis of the graph represents the error in kN. Thus, points on the graph lines 502 represent a given error at a given vehicle load when using a particular combination of sensor angle measurements to remove tilt.

The first graph line 502*a* shows an example where the measured angle of sensors 208*a*, 208*b*, and 208*d* are combined as follows:

$$W = (208b - 208a) + (208d - 208a) \qquad \text{Eqn. 1}$$

In the above equation, and in the equations that follow, the reference numeral for each sensor is used to represent the measured angle or load from that sensor. For example, the operation "208*b*–208*a*" is equal to the measurement from the first sensor 208*a* subtracted from the measurement of the second sensor 208*b*, which can be an angle or a load determined based on an angle or change in angle. The variable "W" represents the estimate of total vehicle load, adjusted for tilt, at that axle (i.e. an estimate of a combination of the force represented by force arrows 228*a* and 228*b* in FIG. 2). Note that since the sensors 208 measure angles, an additional calibration step is required to convert a measured angle to a measured load. This step of correlating angle measurements to loads could be carried out at various points of the operation. For example, each sensor 208 could be calibrated to convert a measured angle into a load measurement in real time. Alternatively, this step could be carried out after the measured angles for one or more sensors 208 are summed and a net angular difference or sum is determined, e.g., at the load measurement system 112. Since the correlation between angle and measured load from each sensor 208 is dependent on the particular placement of that sensor 208 and the overall configuration of the corresponding vehicle, calibration will vary in particular applications, as would be understood by one of skill in the art. Accordingly, it should be understood that each sensor 208 can be described as measuring and reporting data related to a measured angle and/or a measured load.

Equation 1 uses measured data from the second sensor 208*b* and the fourth sensor 208*d*, which are attached to opposing leaf springs 212, on either of the sides 206*a*, 206*b* of the axle 204, as discussed above. Each of the sensors 208*b*, 208*d* is attached at the leaf spring end 216 nearest the pivot connector 214. The first sensor 208*a* is attached to the axle 204 near a center, and is therefore between, e.g., in a lateral dimension, the leaf springs 212 and the sensors 208*b*, 208*d*. To adjust for tilt, the measured angle from the first sensor 208*a* is subtracted from the values of the sensors 208*b*, 208*d* before the remaining values are summed to give a tilt-adjusted load, e.g., accounting for a total flexure, across both sides 206*a*, 206*b* of the suspension system 200. Conceptually, the first term of Equation 1—208*b*–208*a*—corresponds to a first load on the first side 206*a* of the suspension system 200 (e.g., the load corresponding to the arrow 228*a*) and the second term of Equation 1—208*d*–208*a*—corresponds to a second load on the second side 206*b* of the suspension system 200 (e.g., the load corresponding to the arrow 228*b*). Combined, the first load and the second load provide a tilt-adjusted load on the axle 204/suspension system 200.

The second graph line 502*b* shows another example where the measured angles of sensors 208*a*, 208*c*, and 208*e* are combined as to determine a tilt-adjusted load as follows:

$$W = (208c - 208a) + (208e - 208a) \qquad \text{Eqn. 2}$$

Equation 2 is similar to Equation 1, except that Equation 2 uses measured angles from the third angle sensor 208*c* and the fifth angle sensor 208*e*, which are located at opposite leaf spring ends 218 from the second angle sensor 208*b* and the fourth angle sensor 208*d*, respectively. The sensors 208*c*, 208*e* measure the angle of respective leaf springs 212 proximate the shackles 220. As with the example discussed above in connection with Equation 1, to adjust for tilt, the measured angle from sensor 208*a* is subtracted from the measured angle values of the sensors 208*c*, 208*e* before the remaining values are summed to give the tilt-adjusted load across the axle. As discussed above, the angle measurements are converted into a corresponding load measurement, which are then combined to determine the tilt-adjusted load W. As with the first example, the first term of Equation 2—208*c*–208*a*—corresponds to a first load on the first side 206*a* of the suspension system 200 (e.g., the load corresponding to the arrow 228*a*) and the second term of Equation 2—208*e*–208*a*—corresponds to a second load on the second side 206*b* of the suspension system 200 (e.g., the load corresponding to the arrow 228*b*). Combined, the first load and the second load provide a tilt-adjusted load on the axle 204/suspension system 200.

The third graph line 502c shows an example where the measured angles of sensors 208b, 208c, 208d, and 208e are combined as follows:

$$W = (208b - 208c) + (208d - 208e) \qquad \text{Eqn. 3}$$

Equation 3 determines a load adjusted for tilt by calculating the difference between measured angle values at opposite ends of each leaf spring 212, e.g., on the first side 206a and the second side 206b. In particular, Equation 3 determines a difference between an angle or load associated with the second angle sensor 208 band an angle or load associated with the third angle sensor 208c. The second sensor 208b and the third sensor 208c are attached to opposite ends of the leaf spring 212 on the first side 206a of the suspension system 200, as discussed above. This difference will thus provide a weight or load associated the first side 206a of the suspension system 200, e.g., corresponding to the arrow 228a.

The fourth sensor 208d and the fifth sensor 208e are attached to ends of the opposite leaf spring 212, e.g., on the second side 206b of the suspension system 200. Thus, a difference between the angle or load associated with the fourth angle sensor 208d and the angle or load associated with the fifth angle sensor 208e provides a weight or load associated with the second side 206b of the suspension system 200, e.g., corresponding to the arrow 228b. Thus, in Equation 3, tilt is eliminated by subtracting the measured angle of the angle sensors 208c, 208e, proximate the shackles 220, from the measured angle of the corresponding angle sensors 208b, 208d on the opposite end of the corresponding leaf spring 212. The remaining value is then summed to determine the tilt-adjusted load W.

The fourth graph line 502d shows an example where the measured angles of sensors 208f, 208g, and 208h are combined as follows:

$$W = (208h - 208f) + (208g - 208f) \qquad \text{Eqn. 4}$$

Equation 4 uses measured angles from sensors 208h, 208g which are attached to shackles 220 on opposite sides 206a, 206b of the axle 204. Sensor 208f is attached to the vehicle chassis 202. The measured angle at the chassis 202 from sensor 208f is subtracted from the measured angles of sensors 208h, 208g to account for tilt before the remaining value is summed.

Further, in some cases, sensor 208f in Equation 4 can be replaced by sensor 208a. Thus, the measured angles of sensors 208g, 208h, and 208a can be combined as follows:

$$W = (208h - 208a) + (208g - 208a) \qquad \text{Eqn. 5}$$

Equation 5 uses measured angles from sensors 208h, 208g which are attached to shackles 220 on opposite sides 206a, 206b of the axle 204. Sensor 208a is between both shackles 220 and sensors 208h, 208g, and is attached to the axle 204 near the center. To adjust for tilt, the measured angle from sensor 208a is subtracted from the values of sensors 208h, 208g before the remaining values are summed to give the total flexure across both sides 206a, 206b of the suspension system 200.

As illustrated in FIG. 5, in general, errors observed using the techniques described herein, e.g., as embodied by the Equations 1-5, fall within a range of plus or minus 1.5 kN. Typically, the maximum axle load is about 75 kN. Therefore, at the maximum axle load of 75 KN, the observed error corresponds to about a 2% factor of safety. Notably, a standard requirement is sometimes set at 5% factor of safety or better.

Referring again to FIGS. 2-4, and particularly to FIG. 4, vehicle load can also be determined using the angles measured by the angle sensors 208l, 208j. The axle 204 includes the arm 232 which slopes upward from the outside of the leaf spring 212 on each side 206a, 206b of the suspension system 202 to the axle end 210. Force 228a, 228b applied at the axle end 210 therefore causes the axle arms 232 to flex. This deflection can be measured by the sensors 208i, 208j on opposing sides 206a, 206b of the suspension system 202, respectively. Those measurements can then be combined to adjust for vehicle tilt.

Referring now to FIG. 6, a graph 600 of a combination of sensor measurements for determining a load on an axle while removing tilt under test conditions is shown. Graph 600 is similar to graph 500, except that graph 600 relies on the sensor measurements from sensors 208i, 208j which are attached to the axle arms 232 as shown in FIG. 4. Graph line 602a represents a combination of the measurements of sensors 208i and 208j for removing tilt, while graph line 602b represents the same data as graph line 602a after smoothing. During the test, the truck was unloaded from 56 kN to 0 KN, and then loaded back to 56 kN. The x-axis of the graph shows the load in kilonewtons (kN) during the test. The y-axis of the graph represents measurement error in kN.

Graph line 602a shows an example where the measured angles of the sensors 208l, 208j are combined as follows:

$$W = 208i - 208j \qquad \text{Eqn. 6}$$

Similar to the above equations, in Equation 6, the reference numeral for each sensor is used to represent the measured angle from that sensor or a corresponding load associated with the measured angle. Therefore "208i–208j" represents the angle measured by sensor 208j being subtracted from the angle measured by sensor 208i. "W" represents the estimate of total vehicle load at that axle (e.g., an estimate of a combination of the force represented by force arrows 228a and 228b in FIG. 2). As with the other equations herein, additional calibration steps are done to convert the measured angle into a measured force based on that angle to ultimately arrive at the load "W".

Sensors 208i and 208j are located on axle arms 232 on opposite sides 206a and 206b of the vehicle. Further, since the opposing arms 232 will flex in opposite directions, in the example test the sensors 208i, 208j are calibrated to report a delta angle of an opposite sign as the vehicle load increases. For example, sensor 208j could be configured to report a negative measured angle of the deflection of the respective axle arm 232, while sensor 208i could be configured to report a positive measured angle for the deflection of the respective axle arm 232. Therefore, subtracting the angle measured by 208j, which is negative, yields a value equal to the sum of the absolute value of the angles measured by sensors 208i and 208j (i.e., the total or net angle measurement). By combining the angle from these sensors 208i and 208j which are on opposing ends 210 of the axle, e.g., at opposite lateral sides of the suspension system 200, tilt across the vehicle is adjusted for. The smoothing line 602b is provided as a way to provide a more accurate estimate of error at each load value which is based on an average reading, rather than the error of any instantaneous measurement. It can be seen that when an average value of "W" over a time period is considered via the smoothing line 602b, the error falls within the allowable 5% factor of safety Other combinations of sensor measurements also are contemplated for determining a tilt-adjusted load according to aspects of the disclosure described herein. For instance, in the examples of Eqn. 1 and Eqn. 2, sensors 208 on corresponding members on opposite sides of the suspension system 200 are used along with a centrally-located and/or reference sensor. Specifically, in the example of Eqn. 1, the sensors 208b, 208d are similarly situated on the leaf springs 212 and the sensor 208a is centrally-located on the axle 204, and in the example of Eqn. 2, the sensors 208c, 208e are similarly situated on the leaf spring (at ends opposite the sensors 208b, 208d) and the sensor 208a is centrally-located on the axle 204. Similarly, in the example of Eqn. 4, the sensors 208g, 208h are located on the shackles 220 on opposite sides of the suspension system 200 and the sensor 208f is a reference sensor on the chassis 202. As will be appreciated the various components of the suspension system 200 will deflect relative to the chassis 202 and/or to the center of the axle 204. Thus, as in Eqns. 1, 2, and 4, the techniques described herein can determine an overall loading by quantifying the movement experienced at sides of the suspension system relative to the chassis 202 and/or the axle 204. As will be appreciated, because the suspension system 200 comprises a number of mechanically-coupled components, sufficient loading will result in deflections (measured by the angle sensors 208) at all components, regardless of whether the loading is centralized or off-center In some examples, other sensor pairs (e.g., other than the sensor pairs from Eqns. 1, 2, and 4) can be used in a similar manner, e.g., with a reference sensor measurement. Without limitation, the sensors 208l and 208m, associated with the connection members 226, the sensors 208n, 208o, associated with the end portions 238 of the sway bars 234, or the sensors 208p, 208q, associated with the swivel bars 240 can be used in a manner similar to the sensors 208b, 208d in Eqn. 1, the sensors 208c, 208d in Eqn. 2, and/or the sensors 208g, 208h in Eqn. 4.

Also in examples, fewer than three sensors can be used to determine the tilt-adjusted loads. For example, the sensor 208k, associated with the central portion 236 of the sway bar 234, may be used with a reference sensor, like the sensor 208a or the sensor 208f, to determine the tilt-adjusted load. For example, a difference between the displacement (or load) associated with the sensor 208k and the sensor 208a or the sensor 208f may provide a tilt-adjusted load. In experiments conducted by the inventors, load cycle tests like those discussed above and modelled in FIGS. 5 and 6 were conducted using the difference between the sensor 208k and the sensor 208f. Through the cycle, the relative displacement of the sensors is about 13-degrees. Assuming a linear relation between the measured angle and the load, the error is within 1.13 kN, which is a 1.5% factor of safety for a 75 kN axle. The largest part of the error appears to result from hysteresis and is mostly a linear function of the load span, which was modeled as greater than likely in practice. Similar experiments using the sensor 208a instead of the sensor 208f provide substantially similar results.

Aspects of this disclosure can also use different components and/or sensors to determine a tilt-adjusted load. In some instances, additional components may be added to provide better signals (e.g., a greater range of motion) for components of the suspension system 200. FIG. 6 is a non-limiting example that includes a modification to the connection member(s) 226. More specifically, FIG. 6 shows one of the connection members secured at a first end 602 to the chassis 202 and at a second end 604 to the axle 204. In the example, a two-bar linkage 606 is also secured to opposite ends of the connection member 226. More specifically, a first bar 608 of the two-bar linkage 606 extends generally downward (in FIG. 6) from a coupling of the first end 602 of the connection member 226 to the chassis 202, and a second bar 610 of the two-bar linkage 606 extends generally horizontally from the coupling of the second end 604 of the connection member 226 to the axle 204. The first bar 608 and the second bar 610 are attached to each other at a pivot 612. When the connection member 226 expands or compresses, the first bar 608 and the second bar 610 rotate about the pivot 612. In the example of FIG. 6, an angle sensor 614 is disposed to sense an angular displacement of the second bar 610. In other examples, an angle sensor could also or alternatively be configured to sense a displacement of the second bar. In some instances, the angular displacement of the linkage 606 may result in great angular displacement, e.g., greater than the angular displacement of the connection member 226. FIG. 6 is one example of an alternative arrangement. In examples of this disclosure, components that, during loading and unloading produce a relatively large signal, e.g., by deflecting more, may be better candidates for determining a tilt-adjusted load according to aspects described herein. Also in examples, components that exhibit a relatively smaller non-linearity may be preferred. In addition, components that move according to a monotone function may be preferred over other components.

Referring now to FIG. 8, an exemplary angle sensor 800 is shown. Any of the angle sensors 208 can be configured in accordance with the angle sensor 800, except where otherwise shown and described. Further, while it has been described herein that the measured data from the sensors 208 can be combined in specific ways to adjust for tilt, data from the sensor 800 can also be used to adjust for tilt in the area of the sensor 800, as will be discussed in more detail herein. In particular, when the full-scale change in angle is very small, such as less than 2 degrees, the sensor 800 can be relied upon to adjust for tilt, either alone or in combination with other sensors as described herein.

The sensor 800 includes a printed circuit board (PCB) 802 which is attached to a carrier 804, which can be steel. The PCB 802 includes a first capacitor plate 806 proximate a first end 808 and a second capacitor plate 810 proximate a second end 812, opposite the first end 808. An angle sensor chip 814 is positioned near the center of the PCB 802, between the first capacitor plate 806 and the second capacitor plate 810. The first capacitor plate 806 is used to measure a distance C1 between the first capacitor plate 810 and the carrier 804, while the second capacitor plate 810 is used to measure a distance C2 between the second capacitor plate 810 and the carrier 804. The difference between the distance C1 and distance C2 is indicative of the tilt experienced at that sensor 800. Therefore, the difference between the measurements from the first capacitor plate (C1) and measurements from the second capacitor plate (C2) can be used to correct for vehicle tilt. Note that in some cases inductive coils may be used instead of the capacitor plates 806, 810. In such a case, two inductive coils can be positioned at similar locations to the capacitor plates 806, 810 and the difference between the measured values at each inductive coils would be relied on to measure for tilt.

FIG. 9 is an example process 900 for determining a measured vehicle load adjusted for tilt. Without limitation, the process 900 can be performed by one or more of the angle sensors 110, 208, 800, the load measurement system 112, and/or other components. However, the process 900 is not limited to being performed by these components.

In more detail, the process 900 includes, at an operation 902, receiving, from a first angle sensor, first sensor information. In some examples, the first angle sensor may be associated with a first side of the vehicle. For example, the first angle sensor may be any of the angle sensors 208 disposed proximate the first side 206a of the suspension system 200 in FIGS. 2-4. The first sensor information may be data about a first angle measured by the first angle sensor. Alternatively, and as described further herein, the first sensor information may be a load associated with the angle measured by the first angle sensor. Also in examples, the first angle sensor may be associated with other than the first side of the vehicle. Without limitation, the first angle sensor may be associated with any component of the suspension system 200, including the sway bar.

At an operation 904, the process 900 includes receiving, from a second angle sensor, second sensor information. In some examples, the second angle sensor may be associated with a second side of the vehicle. For example, the second angle sensor may be any of the angle sensors 208 disposed proximate the second side 206b of the suspension system 200 in FIGS. 2-4. The second sensor information may be data about a second angle measured by the second angle sensor. Alternatively, and as described further herein, the second sensor information may be a load associated with the angle measured by the second angle sensor. In other examples, the second angle sensor may be associated with other than the second side of the vehicle. Without limitation, the second angle sensor may be associated with any component of the suspension system 200 and/or with the chassis 202 or the axle 204.

At an operation 906, the process 900 includes, optionally, receiving, from one or more additional angle sensors, third sensor information. For example, the additional angle sensors may be any of the angle sensors 208 illustrated in FIGS. 2-4. The third sensor information may be data about angle(s) measured by the additional sensor(s) or load(s) associated with those measured angle(s).

At an operation 908, the process 900 includes determining, based at least in part on the first sensor information, a first vehicle load. As detailed herein, in some examples, the first vehicle load may generally correspond to a load indicated by the arrow 228a in FIG. 2. In some examples, the first vehicle load may be associated with a difference between the first sensor information and reference sensor information, which may be the second sensor information or the third sensor information. Other sensor combinations (and equations associated therewith) that may be used to determine the first vehicle load are detailed in the discussion accompanying FIG. 5. Also, in examples, as detailed in connection with FIG. 6, the first angle sensor may be the ninth angle sensor 208i. In such an example, the first vehicle load may be the load associated with the angle measured by the ninth angle sensor 208i.

At an operation 910, the process 900 includes determining, based at least in part on the second sensor information, a second vehicle load. As detailed herein, in some examples, the second vehicle load may generally correspond to the arrow 228b in FIG. 2. In some examples, the second vehicle load may be associated with a difference between the second sensor information and reference sensor information, which may be the third sensor information. Other sensor combinations (and equations associated therewith) that may be used to determine the second vehicle load are detailed in the discussion accompanying FIG. 5. Also, in examples, as detailed in connection with FIG. 6, the second angle sensor may be the tenth angle sensor 208j. In such an example, the second vehicle load may be the load associated with the angle measured by the tenth angle sensor 208j. In at least one example, the second vehicle load may be a load associated with reference sensor information, such as associated with a sensor associated with the chassis 202 or the axle 204.

At an operation 912, the process 900 includes determining, based on the first vehicle load and the second vehicle load, a measured vehicle load adjusted for tilt. For example, the Equations discussed above in connection with FIGS. 5 and 6 may be used to determine the measured vehicle load as a difference or summation of the first vehicle load and the second vehicle load, e.g., based on an orientation and/or positions of the angle sensors used. In other examples discussed above, the vehicle load adjusted for tilt may be determined based on a difference between a sensor associated with suspension system, e.g., the sensor 208k associated with the central portion 236 of the sway bar 234, and a reference sensor, e.g., the sensor 208a associated with the axle 204, or the sensor 208f associated with the chassis 202.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A vehicle comprising:
a chassis configured to support a body of the vehicle;
a wheel axle having a first end configured to support a first wheel on a first side of the chassis and a second end configured to support a second wheel on a second side of the chassis;
a suspension system configured to deflect relative to at least one of (a) the chassis and (b) the wheel axle in response to a load on the vehicle;
a first angle sensor disposed on at least one of (a) the chassis and (b) the wheel axle, the first angle sensor being configured to measure a first angle associated with the one of the chassis or the wheel axle;
a second angle sensor coupled to a sway bar of the suspension system, the second angle sensor being configured to measure a second angle associated with the sway bar of the suspension system; and
a load measurement system comprising one or more processors and memory storing instructions implemented by the one or more processors to perform actions comprising:

determining, based at least in part on the first angle, a first load associated with the chassis or the wheel axle;

determining, based at least in part on the second angle, a second load associated with the suspension system; and determining, based on the first load and the second load, a measured vehicle load adjusted for tilt.

2. The vehicle of claim 1, wherein a component associated with the suspension system is a linkage associated with a connection member that compresses in response to the load on the vehicle.

3. A vehicle comprising:

a chassis configured to support a body of the vehicle;

a suspension system comprising (1) a wheel axle having a first end configured to support a first wheel on a first side of the chassis and a second end configured to support a second wheel on a second side of the chassis, and (2) a sway bar having an elongated central portion extending between two spaced-apart end portions, each spaced-part end portion angled relative to the central portion, the sway bar configured to deflect relative to at least one of (a) the chassis and (b) the wheel axle in response to a load on the vehicle;

a first leaf spring coupled to the wheel axle proximate the first side of the chassis;

a second leaf spring coupled to the wheel axle proximate the second side of the chassis;

a first angle sensor coupled to at least one of (i) the wheel axle proximate the first wheel and (ii) the first leaf spring, the first angle sensor being configured to measure a first angle;

a second angle sensor coupled to at least one of (i) the wheel axle proximate the second wheel, (ii) the second leaf spring and (iii) the sway bar, the second angle sensor being configured to measure a second angle; and a load measurement system comprising one or more processors and memory storing instructions implemented by the one or more processors to perform actions comprising:

determining, based at least in part on the first angle, a first load associated with the chassis;

determining, based at least in part on the second angle, a second load associated with the chassis; and determining, based on the first load and the second load, a measured vehicle load adjusted for tilt;

a third angle sensor disposed on at least one of (a) the wheel axle and (b) the chassis and configured to measure a third angle, wherein the determining the measured vehicle load comprises, at least in part, determining a first difference between the first angle and the third angle and a second difference between the second angle and the third angle;

wherein the third angle sensor is disposed, in a lateral direction, between the first angle sensor and the second angle sensor; and wherein:

the first leaf spring extends between a first end and a second end, the second leaf spring extends between a third end and a fourth end, the first angle sensor is attached to the first leaf spring proximate the first end of the first leaf spring; and the second angle sensor is attached to the sway bar proximate a middle of the central portion of the sway bar.

4. A vehicle comprising:

a chassis configured to support a body of the vehicle;

a suspension system comprising (1) a wheel axle having a first end configured to support a first wheel on a first side of the chassis and a second end configured to support a second wheel on a second side of the chassis, and (2) a sway bar having an elongated central portion extending between two spaced-apart end portions, each spaced-part end portion angled relative to the central portion, the sway bar configured to deflect relative to at least one of (a) the chassis and (b) the wheel axle in response to a load on the vehicle;

a first leaf spring coupled to the wheel axle proximate the first side of the chassis;

a second leaf spring coupled to the wheel axle proximate the second side of the chassis;

a first angle sensor coupled to at least one of (i) the wheel axle proximate the first wheel and (ii) the first leaf spring, the first angle sensor being configured to measure a first angle;

a second angle sensor coupled to at least one of (i) the wheel axle proximate the second wheel, (ii) the second leaf spring and (iii) the sway bar, the second angle sensor being configured to measure a second angle; and a load measurement system comprising one or more processors and memory storing instructions implemented by the one or more processors to perform actions comprising:

determining, based at least in part on the first angle, a first load associated with the chassis;

determining, based at least in part on the second angle, a second load associated with the chassis; and determining, based on the first load and the second load, a measured vehicle load adjusted for tilt; and the wheel axle includes a first axle arm proximate the first wheel and a second axle arm proximate the second wheel;

the first angle sensor is configured to determine an angular deflection of the first axle arm proximate the first wheel; and the second angle sensor is configured to determine an angular displacement of at least one of the spaced-part end portion of the sway bar.

\* \* \* \* \*